Patented Sept. 27, 1927.

1,643,821

UNITED STATES PATENT OFFICE.

ARTHUR W. QUIGGLE, OF MINNEAPOLIS, MINNESOTA, ASSIGNOR TO THE CREAMETTE COMPANY, OF MINNEAPOLIS, MINNESOTA, A CORPORATION.

PROCESS OF DRYING MACARONI.

No Drawing. Application filed July 8, 1920, Serial No. 394,741. Renewed December 2, 1926.

My invention relates to processes of drying macaroni and other products made from a paste of flour and water. The principal object of this invention is to remove the surplus water from the paste product after the same has been mixed and formed at the presses without the consumption of time and large expenditure of hand labor incident to the method at present in use of drying such paste products, wherein it is customary to subject the product to the action of air or currents of air at atmospheric temperature or at temperature very slightly above atmospheric temperature with frequent manual change of position of the macaroni product, the old processes consuming several days and requiring large numbers of operatives. It is the object of my invention to effect the complete drying process in a few minutes time by the use of air heated to a comparatively high temperature, and at the same time to produce as perfectly formed, colored and cured a product as has been done by the tedious and expensive hand methods heretofore employed.

It has heretofore been thought impossible to dry macaroni and paste products rapidly on account of the fact that rapid drying has produced upon the tube of paste as heretofore constructed such shrinkage strains as have resulted in cracking and breaking the macaroni tubes, thus rendering the macaroni products commercially worthless; also in whitening and flaking the product so as in this manner to detract from its salability.

I have discovered that by making the walls of the paste product very thin, and subjecting the same to currents of heated air at a relatively high temperature—from 165° to 185° Fahrenheit—the macaroni and paste products can be very rapidly dried without the cracking, flaking or whitening which destroys the value of the product.

I also have discovered that lower temperatures, and yet considerably higher than those that have been used in the past, do produce the afore-mentioned injurious effects, that is, temperatures above 120° and below 150° Fahrenheit do result in varying degrees of cracking, flaking and whitening of the product, whereas temperatures at or above the upper limit mentioned not only produce very rapid drying, but leave the product free from cracks and breaks and with its natural color, preferably. The macaroni will not only be molded with very thin walls, but also will be cut into short pieces, insuring rapid transmission of the hot air around and through the numerous tube pieces. The very thin walls referred to here signify that the walls of the macaroni tubes are very much thinner than the walls of the customary macaroni tubes, which are several times thicker than the walls of my tube.

It is also an important part of my process that the operation of automatic drying is to be effected by subjecting the material to currents of hot air until the entire moisture content which it is desirable to remove from the product has been drawn out and the product is ready for packaging. In the practice of my process this can ordinarily be done in a very short time, only a few minutes, whereas in the past practice it has taken, as above noted, several days. It is, however, preferable to agitate the material while the same is being acted upon by the heated air in order that different parts of the material may be exclusively exposed to direct currents of the air, and also so that the material will not remain in contact with any supporting trough or tray, which might be formed with bottoms of wire netting or other perforated material suitable for permitting the air to pass through such bottom.

I claim:

1. The process of drying macaroni which consists in forming the macaroni tubes with very thin walls, subjecting the macaroni to a current of air heated to a temperature of from 165° to 185° Fahrenheit, and continuously subjecting the material to such heated air until the entire moisture content of said material which it is desirable to remove has been drawn out.

2. The process of drying macaroni which consists in forming the macaroni tubes with very thin walls, cutting the tubes into short pieces, subjecting the mass of pieces to a current of air heated to a temperature of from 165° to 185° Fahrenheit, and continuously subjecting the material to such heated air until the entire moisture content of said material which it is desirable to remove has been drawn out.

3. The process of drying macaroni which consists in forming the macaroni tubes with very thin walls, cutting the macaroni into short pieces, subjecting the mass of pieces to a current of air heated to a temperature of from 165° to 185° Fahrenheit, agitating the mass of pieces while subjected to the heated air, and continuously subjecting the material to such heated air and agitation until the entire moisture content of said material which it is desirable to remove has been drawn out.

4. The process of drying macaroni which consists in forming the macaroni tubes with very thin walls, and subjecting the macaroni to a current of air heated to a temperature not less than 150° nor more than 185° Fahrenheit for such a length of time that the said heated air will remove the entire moisture content of said macaroni which it is desirable to have removed.

5. The process of drying macaroni which consists in forming thin walled macaroni tubes cut into short pieces, and subjecting the mass of pieces to currents of air heated to a temperature of not less than 150° nor more than 185° Fahrenheit for such a length of time as will cause the heated air to withdraw the entire moisture content of said macaroni which it is desirable to remove therefrom.

6. The process of drying macaroni which consists in forming thin walled macaroni tubes cut into short pieces, subjecting the mass of pieces to currents of air heated to a temperature of not less than 150° nor more than 185° Fahrenheit for such a length of time as will cause the heated air to withdraw the entire moisture content of said macaroni which it is desirable to remove therefrom, and agitating the mass of pieces while the same are subjected to the heated air.

7. The process of drying macaroni which consists in forming the macaroni tubes with thin walls, subjecting the macaroni to a current of air heated to a temperature much higher than atmospheric temperature and higher than 150° Fahrenheit, and continuously subjecting the material to such heated air until the entire moisture content of said material which it is desirable to remove has been drawn out.

In testimony whereof I hereunto affix my signature.

ARTHUR W. QUIGGLE.